United States Patent Office 3,277,103
Patented Oct. 4, 1966

3,277,103
β-AMINO-α-CYANOACROLEINS AND THEIR PREPARATION
Swiatoslaw Trofimenko, Wilmington, Del., assignor to E. I. du Pont de Nemours and Company, Wilmington, Del., a corporation of Delaware
No Drawing. Filed June 29, 1961, Ser. No. 120,496
18 Claims. (Cl. 260—294.7)

This invention relates to a new class of functionally substituted unsaturated aldehydes and to a method of preparing them.

The new compounds of this invention are β-amino-α-cyanoacroleins of the formula:

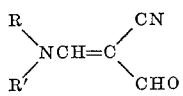

wherein R is selected from the group consisting of hydrogen, alkyl of up to 18 carbons, cycloalkyl of 3–18 carbons, allyl, propargyl, 2-cyclohexenyl and aralkyl of up to 18 carbons with the proviso that the aryl group is selected from phenyl and naphthyl; and R' is selected from the group consisting of hydrogen and alkyl of up to 18 carbons in which the α-carbon (carbon bonded to nitrogen) is bonded directly to at most one other carbon; and wherein R and R' taken together is selected from the group consisting of 1,4-buten-2-ylene and an alkylene group of 2–18 carbons in which at least one of the α-carbons (i.e., one of the two carbons bonded to nitrogen) is bonded directly to only one other carbon.

Because their starting materials are more readily available, the preferred products are those of the preceding paragraph in which the total number of carbons in R plus R' does not exceed 18. Of these, the more preferred are those in which R and R', taken individually are hydrogen, or alkyl or cycloalkyl of up to 8 carbons, the total number of carbons in R plus R' being up to 8, and R and R' joined together is alkylene of 2–8 carbons.

β-Amino-α-cyanoacrolein, the compound in which R and R' are hydrogen, is prepared by reacting molecular hydrogen and water with cyanoform, HC(CN)₃, in the presence of a hydrogenation catalyst. The amount of water employed is not critical but the molar ratio of water to cyanoform is usually in excess of 1:1. Actually, cyanoform is readily available in the form of a solution of cyanoform, water and an inert solvent, and such solutions may conveniently be employed regardless of their concentration. Preferably an aquoethereal solution of cyanoform is used. The ether in the aquoethereal solution may be any alkyl ether in which each alkyl group contains 1 to 3 carbon atoms, e.g., ethyl ether or isopropyl ether. Examples of suitable catalysts are palladium, platinum, ruthenium, nickel, rhodium and platinum oxide, either alone or mixed, and either unsupported or on supports such as carbon, silica and alumina.

The reaction proceeds at any temperature up to the decomposition point of the product (about 225° C.). The lower temperature limit is not critical and will depend upon the form in which the cyanoform is used. For example, when an aquoethereal solution of cyanoform is employed, the temperature should not be below the point at which the solution begins to freeze (about −10° C.). Preferably, ordinary temperatures (20–30° C.) are used.

The pressure is not critical. For example, it may be as high as 3000 atmospheres or even higher depending upon the pressure resistance of the apparatus being utilized. However, there does not appear to be any advantage in exceeding a pressure of about 10 atmospheres. Preferably, the reaction is conducted at slightly elevated pressures, e.g., 1.5–3 atmospheres.

As is customary in catalytic hydrogenation processes, an excess of hydrogen is usually employed, e.g., at least about 2 moles of hydrogen per mole of cyanoform. Preferably, the molar ratio of hydrogen to cyanoform is in the range of 2:1 to 10:1. The amount of catalyst is not critical and any amount sufficient to catalyze the reaction will suffice. The weight of catalyst may be as low as .01% by weight of cyanoform, or even lower depending on the particular catalyst employed. The maximum amount of catalyst is governed solely by economic considerations, i.e., amounts in excess of that required to catalyze the reaction are not deleterious but offer no advantage. Preferably, the amount of catalyst is in the range of 1–20% by weight of cyanoform.

The hydrogenation is conveniently carried out in a standard closed-system apparatus equipped with means for measuring pressure, for admitting a gas under pressure, and for agitation. The course of the reaction can be followed by the rate of absorption of hydrogen. When absorption ceases, the reaction is through. β-Amino-α-cyanoacrolein is sparingly soluble in the reaction mixture. It can be separated by filtration or centrifugation and purified by recrystallization.

The other products of this invention are readily obtained by reacting β-amino-α-cyanoacrolein with an amine containing at least one hydrogen on the nitrogen, i.e., a primary or secondary amine. The reaction can be represented by the following equation:

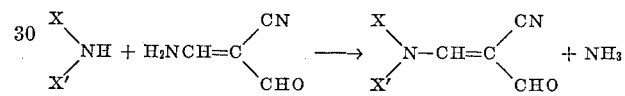

wherein X may be any group within the definition of R and X' may be any group within the definition of R', at most one of X and X' being hydrogen. Temperatures from 0° C. up to the decomposition point of β-amino-α-cyanoacrolein (about 225° C.) can be used. Temperatures of 25–150° C. are preferred. The reaction is conveniently carried out at atmospheric pressure, although higher pressures may be used. In general, for amines containing larger and bulkier X and/or X' groups, higher temperatures and longer times are required for reaction. Amines in which X and X' are joined together to form an alkylene group or 1,4-buten-2-ylene group are generally more reactive than amines of approximately the same molecular weight in which X and X' are separate groups. The mole ratio of reactants is not critical; usually an excess of the amine is used to insure complete conversion of the β-amino-α-cyanoacrolein. A solvent for the reactants, such as ethyl alcohol, tetrahydrofuran, or 1,2-dimethoxyethane, can be used if desired. Use of a solvent is especially advantageous, but not required, if the amine is a gas under ordinary conditions. If the amine is a liquid, an excess of the amine can function as solvent. The course of the reaction can be followed by the rate of evolution of ammonia. When evolution ceases the reaction is complete. The product can be isolated by evaporating the solvent or by precipitating with a nonsolvent such as ethyl ether, and can be purified by recrystallization or sublimation.

The precursor amines [(X)(X')NH] are either commercially available or can be prepared by known prior art processes.

The β-amino-α-cyanoacroleins of this invention are crystalline solids with sharp melting points and are stable to air and water. They are soluble in solvents such as 1,2-dimethoxyethane and methylene chloride and insoluble in hydrocarbons, such as benzene, and monoethers, such as ethyl ether. They recrystallize well from water, alcohols, or water-alcohol mixtures. The presence of an amino group, a cyano group, an aldehyde group, and an ethylenic double bond make them useful as intermediates in chemical syntheses.

The process and products of this invention are illustrated by the following examples, in which all parts are by weight.

EXAMPLE 1

*β-Amino-α-cyanoacrolein*

$$N\equiv C-CH\begin{matrix}CN\\ \\CN\end{matrix} \xrightarrow[H_2O]{H_2} H_2NCH=C\begin{matrix}CN\\ \\CHO\end{matrix}$$

An aquoethereal solution of cyanoform was prepared by the following procedure, based on the disclosures of Schmidtmann, Ber. 29, 1171 (1896), and of Hantzsch and Osswald, Ber. 32, 641 (1899). The potassium salt of cyanoform (33 parts) was dissolved in 85 parts of water, 213 parts of ethyl ether was added, and the mixture was cooled to 0° C. in an ice-salt bath. Concentrated sulfuric acid (25 parts) was added, with stirring and cooling, at such a rate that the temperature did not exceed 10° C. The cooling bath was removed and stirring was continued for 20 minutes. The resulting mixture contained three liquid layers. The middle layer was separated; according to Hantzsch and Osswald, it contained $$HC(CN)_3/H_2O/(C_2H_5)_2O$$

in a molar ratio of 1/10/10.

Seventy-nine parts of this middle layer was charged, together with one part of 10% palladium-on-charcoal in 10 parts of acetic acid, to a glass pressure reactor equipped with a pressure gauge, a means of admitting hydrogen under pressure, and a means of agitation. The volume of the reactor was approximately that of 400 parts of water. Hydrogen gas was admitted to a total pressure of 38 lb./sq. in., and the mixture was agitated at room temperature and 29–38 lb./sq. in., with repressuring as required, for four hours. By this time absorption of hydrogen, as indicated by pressure drop, had ceased. The undissolved solid was separated by filtration. (Evaporation of the filtrate gave crude aminomethylenemalononitrile, $H_2NCH=C(CN)_2$, another product of the hydrogenation.) As much of the solid as possible was dissolved in boiling water, and the hot mixture was filtered and cooled. β-Amino-α-cyanoacrolein precipitated as white crystals, which were separated by filtration and dried. The yield was 3.5 parts (48%). After a second recrystallization from water, the product melted at 215–216° C. with decomposition.

*Analysis.*—Calcd. for $C_4H_4N_2O$: C, 49.99%; H, 4.20%; N, 29.16%; M.W., 96.02. Found: C, 50.20%; H, 4.06%; N, 28.94%; M.W., 91, 88 (ebull. in acetone).

The infrared spectrum showed a conjugated nitrile band at 4.49μ and amino bands at 3.04, 3.20, and ca. 6.2μ. The ultraviolet spectrum had $\lambda_{max}$ 269 mμ, log ε 4.31. The structure of the product was further confirmed by the nuclear magnetic resonance spectra of the substituted amino products of Examples 7 and 10.

EXAMPLE 2

*β-Amino-α-cyanoacrolein*

Aquoethereal cyanoform was prepared by the method of Example 1 from 13 parts of the potassium salt of cyanoform, 80 parts of water, 142 parts of ethyl ether, and 10 parts of concentrated sulfuric acid. The entire middle layer of the product mixture was combined with 0.4 part of 10% palladium-on-charcoal and four parts of acetic acid, and the mixture was subjected to hydrogenation by the method of Example 1. The product mixture was evaporated to dryness, and the residue was recrystallized from water, the hot mixture being filtered to remove hydrogenation catalyst. The yield of β-amino-α-cyanoacrolein was 3.7 parts (40%).

When this procedure was repeated with 0.25 part of 10% palladium-on-charcoal and no acetic acid, a lower yield of β-amino-α-cyanoacrolein was realized. The major product was aminomethylenemalononitrile.

EXAMPLE 3

*β-Methylamino-α-cyanoacrolein*

$$\begin{matrix}CH_3\\ \\H\end{matrix}N-CH=C\begin{matrix}CN\\ \\CHO\end{matrix}$$

To a slurry of 1.92 parts of β-amino-α-cyanoacrolein, prepared by the method of Example 2, in 26 parts of 1,2-dimethoxyethane was added 1.54 parts of methylamine with stirring at room temperature. Evolution of ammonia began immediately. The mixture was stirred until evolution of ammonia ceased and a complete solution resulted (less than 15 minutes). A small sample of the mixture was evaporated to dryness to give a solid residue. The remainder of the mixture was diluted with a large volume of ethyl ether, and the solid obtained by evaporation of the small sample was added. This seeding brought about precipitation of a crystalline solid, which was separated by filtration, washed with ethyl ether, and dried, to give 1.34 parts (61%) of β-methyl-amino-α-cyanoacrolein. After recrystallization from isopropyl alcohol, the product melted at 118.5–119° C.

*Analysis.*—Calcd. for $C_5H_6N_2O$: C, 54.54%; H, 5.49%. Found: C, 54.42%; H, 5.31%.

EXAMPLE 4

*β-n-Butylamino-α-cyanoacrolein*

$$\begin{matrix}n\text{-}C_4H_9\\ \\H\end{matrix}N-CH=C\begin{matrix}CN\\ \\CHO\end{matrix}$$

Excess n-butylamine was added to β-amino-α-cyanoacrolein with agitation at room temperature. Evolution of ammonia began immediately, and a solution soon resulted. On evaporation of excess n-butylamine, β-n-butylamino-α-cyanoacrolein was isolated as a waxy solid.

EXAMPLE 5

*β-Tert-butylamino-α-cyanoacrolein*

$$\begin{matrix}(CH_3)_3C\\ \\H\end{matrix}N-CH=C\begin{matrix}CN\\ \\CHO\end{matrix}$$

Excess tert butylamine (4.9 parts) was added to one part of β-amino-α-cyanoacrolein, and the mixture was warmed gently on a steam bath with stirring. Ammonia was evolved, and a complete solution was obtained within 15 minutes. On evaporation of the excess amine, there was obtained 1.37 parts (95%) of colorless, crystalline β-tert-butylamino-α-cyanoacrolein. After recrystallization from a mixture of water and ethyl alcohol, the product melted at 122–123° C., with some sublimation near the melting point.

*Analysis.*—Calcd. for $C_8H_{12}N_2O$: C, 63.13%; H, 7.95%; N, 18.41%; M.W., 152. Found: C, 63.69%; H, 8.00%; N, 18.93%; 19.03; M.W., 148, 139.

EXAMPLE 6

*β-(1,1,3,3-tetramethylbutylamino)-α-cyanoacrolein*

$$\begin{matrix}CH_3 & CH_3\\ | & |\\ CH_3-C-CH_2-C\\ | & |\\ CH_3 & CH_3\end{matrix}N-CH=C\begin{matrix}CN\\ \\CHO\end{matrix}$$

1,1,3,3-tetramethylbutylamine (2.58 parts) was added to a slurry of 1.92 parts of β-amino-α-cyanoacrolein in 26 parts of 1,2-dimethoxyethane. The mixture was stirred at room temperature for 16 hours and then boiled under reflux with stirring for 15 minutes. Evaporation of the solvent and recrystallization of the solid residue from a mixture of water and ethyl alcohol gave 1.3 parts (31%) of white, crystalline β-(1,1,3,3-tetramethylbutyl-amino)-α-cyanoacrolein melting at 123–124° C.

*Analysis.*—Calcd. for $C_{12}H_{20}N_2O$: C, 69.19%; H, 9.68%; N, 13.45%. Found: C, 71.05%; H, 9.69%; N, 14.17%, 14.54.

EXAMPLE 7

*β-Dimethylamino-α-cyanoacrolein*

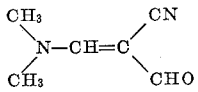

An excess of gaseous dimethylamine was bubbled into a slurry of 2.0 parts of β-amino-α-cyanoacrolein in 22 parts of 1,2-dimethoxyethane with stirring, and the mixture was stirred at room temperature for 16 hours, within which time a complete solution formed. The mixture was seeded and diluted with ethyl ether as described in Example 3. The crystalline solid that precipitated was separated by filtration and dried, to give 2.2 parts (85%) of β-dimethylamino-α-cyanoacrolein. After recrystallization from a mixture of water and ethyl alcohol, the product melted at 144–145° C.

*Analysis.*—Calcd. for $C_6H_8N_2O$: C, 58.05%; H, 6.50%. Found: C, 58.22%, 57.91%; H, 6.47%.

The nuclear magnetic resonance spectrum of the product, measured in deuteroacetone solution, showed three sharp peaks, at field values corresponding to the $CH_3$ hydrogens, the CH=C hydrogen, and the CHO hydrogen. The areas under these peaks were in the ratio 6:1:1, corresponding to the number of hydrogens of each type.

EXAMPLE 8

*β-diethylamino-α-cyanoacrolein*

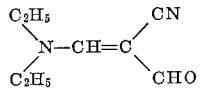

An excess of diethylamine was added to β-amino-α-cyanoacrolein, and the mixture was heated at 95° C. with agitation until evolution of ammonia ceased. There was obtained a syrupy yellow product, which was essentially β-diethylamino-α-cyanoacrolein.

EXAMPLE 9

*β-pyrrolidino-α-cyanoacrolein*

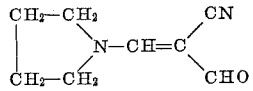

To a slurry of 1.92 parts of β-amino-α-cyanoacrolein in 30 parts of 1,2-dimethoxyethane was added two parts of pyrrolidine, and the mixture was stirred at room temperature. Evolution of ammonia began immediately and was complete within 15 minutes, by which time a solution had resulted. After seeding and diluting with ethyl ether as described in Example 3, there was obtained 2.6 parts (87%) of crystalline β - pyrrolidino - α - cyanoacrolein. After recrystallization from isopropyl alcohol, the product melted at 114.5–115.5° C. It was soluble in 1,2-dimethoxyethane, methylene chloride, and chloroform, and insoluble in ethyl ether.

*Analysis.*—Calcd. for $C_8H_{10}N_2O$: C, 63.98%; H, 6.71%. Found: C, 63.92%; H, 6.72%.

EXAMPLE 10

*β-piperidino-α-cyanoacrolein*

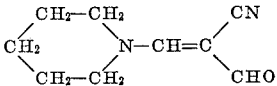

To a slurry of 2.0 parts of β-amino-α-cyanoacrolein in 34 parts of 1,2-dimethoxyethane was added 2.0 parts of piperidine, and the mixture was heated on a steam bath with stirring until no more ammonia was evolved and a yellow solution was obtained (15 minutes). The mixture was seeded as described in Example 3 and diluted with 71 parts of ethyl ether, and this mixture was stirred at room temperature for 16 hours. The resulting crystals were separated by filtration and dried to give 2.1 parts (66%) of β-piperidino-α-cyanoacrolein. After recrystallization from a mixture of water and ethyl alcohol, the product melted at 105–106° C.

*Analysis.*—Calcd. for $C_8H_{12}N_2O$: C, 65.83%; H, 7.34%. Found: C, 65.46%; H, 7.50%.

The nuclear magnetic resonance spectrum of the product, measured in deuteroacetone solution, showed peaks characteristic of the piperidine protons (a singlet and a doublet in a 6:4 area ratio) plus vinyl and aldehyde proton peaks, both with relative areas of 1.

EXAMPLE 11

*β-cyclohexylamino-α-cyanoacrolein*

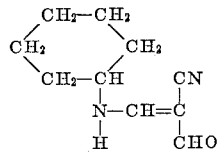

Cyclohexylamine (0.99 part) was added to a slurry of 0.92 part of β-amino-α-cyanoacrolein in 13 parts of 1,2-dimethoxyethane, and the mixture was heated at 50° C. with stirring for 15 minutes, during which time the solid dissolved and ammonia was evolved. Evaporation of the solvent gave 1.7 parts (quantitative yield) of β-cyclohexylamino-α-cyanoacrolein as a crystalline solid. After recrystallization from hexane, the product melted at 87–88° C. In agreement with the above structure, the infrared absorption spectrum of the product showed absorption at 3.09μ (NH), 4.53μ (conj. CN), and 5.99μ (conj. >C=O); the ultraviolet spectrum had $\lambda_{max.}$=280 mμ, log ε=4.38.

Amines other than those employed in the preceding examples may be employed in the process of the invention, as heretofore defined, to prepare different β-amino-α-cyanoacroleins as shown in the following table:

TABLE I

| Amine | Product |
|---|---|
| Isopropylamine | $(CH_3)_2CH$<br>$\phantom{xxx}\diagdown$<br>$\phantom{xxxxx}$NCH=C(CN)(CHO)<br>$\phantom{xxx}\diagup$<br>H |
| Allylamine | $CH_2$=CH—$CH_2$<br>$\phantom{xxxxx}\diagdown$<br>$\phantom{xxxxxxx}$NCH=C(CN)(CHO)<br>$\phantom{xxxxx}\diagup$<br>H |
| Isobutylpropargylamine | CH≡C—$CH_2$<br>$\phantom{xxxxx}\diagdown$<br>$\phantom{xxxxxxx}$NCH=C(CN)(CHO)<br>$\phantom{xxxxx}\diagup$<br>$(CH_3)_2CHCH_2$ |

| Amine | Product |
|---|---|
| n-Octylamine | n—C$_8$H$_{17}$\NCH=C(CN)(CHO) / H |
| n-Dodecylamine | n—C$_{12}$H$_{25}$\NCH=C(CN)(CHO) / H |
| 1-(n-heptyl)-n-octylamine | (n—C$_7$H$_{15}$)$_2$CH\NCH=C(CN)(CHO) / H |
| n-Octadecylamine | n—C$_{18}$H$_{37}$\NCH=C(CN)(CHO) / H |
| n-Hexylmethylamine | n—C$_6$H$_{13}$\NCH=C(CN)(CHO) / CH$_3$ |
| n-Dodecylethylamine | n-C$_{12}$H$_{25}$\NCH=C(CN)(CHO) / C$_2$H$_5$ |
| n-dodecyl-n-hexylamine | n-C$_{12}$H$_{25}$\NCH=C(CN)(CHO) / n-C$_6$H$_{13}$ |
| Di-n-pentylamine | n-C$_5$H$_{11}$\NCH=C(CN)(CHO) / n-C$_5$H$_{11}$ |
| Di-n-nonylamine | n-C$_9$H$_{19}$\NCH=C(CN)(CHO) / n-C$_9$H$_{19}$ |
| Benzylamine | C$_6$H$_5$—CH$_2$\NCH=C(CN)(CHO) / H |
| Methyl-1-phenylethylamine | C$_6$H$_5$\CH / CH$_3$ \NCH=C(CN)(CHO) / CH$_3$ |
| 2-(α-naphthyl)ethylamine | α-C$_{10}$H$_7$—(CH$_2$)$_2$\NCH=C(CN)(CHO) / H |
| 1-phenyl-n-dodecylamine | C$_6$H$_5$\CH / n-C$_{11}$H$_{23}$ \NCH=C(CN)(CHO) / H |
| Cyclopropylamine | (CH$_2$)$_2$CH\NCH=C(CN)(CHO) / H |
| Cyclopentylamine | (CH$_2$)$_4$CH\NCH=C(CN)(CHO) / H |
| 2-cyclohexenylamine | [cyclohexenyl]—NCH=C(CN)(CHO) / H |
| Cyclooctylamine | (CH$_2$)$_7$CH\NCH=C(CN)(CHO) / H |

| Amine | Product |
|---|---|
| Cyclooctadecylamine | (CH₂)₁₇CH⟩NCH=C(CN)(CHO), H |
| 9-aminodecahydronaphthalene | [decahydronaphthyl]—NCH=C(CN)(CHO), H |
| 3-isopropylcyclopentylamine | (CH₃)₂CH—CH—CH₂, CH₂—CH₂, CH⟩NCH=C(CN)(CHO), H |
| 4-(n-butyl)-cyclohexylamine | n-C₄H₉—CH, CH₂—CH₂, CH₂—CH₂, CH⟩NCH=C(CN)(CHO), H |
| Cyclobutylmethylamine | (CH₂)₃⟩CH⟩NCH=C(CN)(CHO), CH₃ |
| Cyclodecylmethylamine | (CH₂)₉⟩CH⟩NCH=C(CN)(CHO), CH₃ |
| Cyclohexyl-n-dodecylamine | (CH₂)₅⟩CH⟩NCH=C(CN)(CHO), n-C₁₂H₂₅ |
| Ethylenimine | CH₂⟩NCH(CN)(CHO), CH₂ |
| 3-pyrroline | CH—CH₂, ‖ ⟩NCH=C(CN)(CHO), CH=CH₂ |
| 3-ethylpyrrolidine | CH₂—CH₂, ⟩NCH=C(CN)(CHO), C₂H₅—CH—CH₂ |
| Octamethylenimine | (CH₂)₈NCH=C(CN)(CHO) |
| 3,6-dimethylhexamethylenimine | CH₃, CH—CH₂, (CH₂)₂⟩NCH=C(CN)(CHO), CH—CH₂, CH₃ |
| Hexadecamethylenimine | (CH₂)₁₆NCH=C(CN)(CHO) |

The β-amino-α-cyanoacroleins of this invention absorb strongly in the ultraviolet region, with values of $\lambda_{max}$ ranging from 269 mμ to 282 mμ. Because of this property, they are useful in protecting light-sensitive materials from the action of sunlight.

The aldehyde groups of the products of this invention react with 2,4-dinitrophenylhydrazine to give colored products that can be used to dye fabrics made from natural and synthetic fibers, as demonstrated in the following example.

EXAMPLE A 2,4-dinitrophenylhydrazones were made by the reaction of 2,4-dinitrophenylhydrazine with β-tert-butylamino-α-cyanoacrolein and β-pyrrolidino-α-cyanoacrolein by the method of Shriner and Fuson, "Identification of Organic Compounds," 3rd edition (Wiley, 1948), page 171. The fabric to be dyed was agitated in an 0.1% aqueous solution of a commercial surface-active agent consisting essentially of the sodium salt of a long-chain-alkylbenzenesulfonate. A 1% solution in dimethylformamide of one of the 2,4-dinitrophenylhydrazones described above was added, and the fabric was agitated for from 5 to 10 minutes in the mixture at 95° C. The fabric was then removed from the bath, rinsed thoroughly with water, and dried. By this method, colors ranging from golden yellow to light tan were conferred on fabrics made from silk, wool, cellulose acetate, regenerated cellulose (xanthate process), polymeric hexamethyleneadipamide, and a commercial acrylonitrile/N-vinylpyrrolidone (89/11) copolymer, the exact color depending on the fabric and the 2,4-dinitrophenylhydrazone used. In addition, the 2,4-dinitrophenylhydrazone of β-pyrrolidino-α-cyanoacrolein dyed a commercial acrylonitrile/vinyl acetate/2-methyl-5-vinylpyridine terpolymer of approximate composition 91/4/5.

The products of this invention are also useful as inhibitors of vinyl polymerization, as shown in the following example.

EXAMPLE B

A number of polymerization mixtures were made up, each containing 1.86 parts of redistilled vinyl acetate, 0.05 part of azoisobutyronitrile, and 0.1 part of a β-amino-α-cyanoacrolein. Each mixture was heated to 80° C. and held at this temperature for 45 minutes, or until polymerization occurred, if in a shorter time. The results are given in the following table:

| β-Amino-α-cyanoacrolein Additive [(R)(R')N-segment] | Observation |
| --- | --- |
| (Control; no additive) | Mixture completely solid in 10 min. |
| Do | Same. |
| (CH₃)₂N— | Liquid still free-flowing after 45 min. |
| 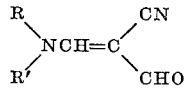 | Do. |
|  | Do. |
| CH₃NH— | Do. |
| (CH₃)₃CNH— | Liquid more viscous but still flowable after 45 min. |
| H₂N— | Same. |

The observations show that the β-amino-α-cyanoacroleins of this invention inhibited the polymerization of vinyl acetate at least partially, and in some cases completely, for at least 45 minutes under conditions whereby the monomer was completely polymerized within 10 minutes in the absence of an additive other than the initiator.

The foregoing detailed description has been given for clarity of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula:

$$\underset{R'}{\overset{R}{\diagdown}}NCH=C\underset{CHO}{\overset{CN}{\diagup}}$$

wherein R is selected from the group consisting of hydrogen, alkyl of up to 18 carbons, cycloalkyl of 3–18 carbons, allyl, propargyl, 2-cyclohexenyl and aralkyl of up to 18 carbons with the proviso that the aryl group is selected from phenyl and naphthyl; and R' is selected from the group consisting of hydrogen and alkyl of up to 18 carbons in which the α-carbon is bonded directly to at most one other carbon; and R and R' taken together is selected from the group consisting of 1,4-buten-2-ylene and alkylene of 2–18 carbons in which at least one α-carbon is bonded directly to at most one other carbon.

2. β-Amino-α-cyanoacrolein.
3. β-Methylamino-α-cyanoacrolein.
4. β-n-Butylamino-α-cyanoacrolein.
5. β-Tert-butylamino-α-cyanoacrolein.
6. β - (1,1,3,3 - tetramethylbutylamino)-α-cyanoacrolein.
7. β-Dimethylamino-α-cyanoacrolein.
8. β-Diethylamino-α-cyanoacrolein.
9. β-Pyrrolidino-α-cyanoacrolein.
10. β-Piperidino-α-cyanoacrolein.
11. β-Cyclohexylamino-α-cyanoacrolein.
12. The process of preparing β-amino-α-cyanoacrolein which comprises reacting molecular hydrogen and water with cyanoform in the presence of a hydrogenation catalyst at a temperature of about −10° C. to about 225° C.
13. A process for preparing compounds of claim 1 which comprises reacting unsubstituted β-amino-α-cyanoacrolein with an amine of the formula:

$$\underset{X'}{\overset{X}{\diagdown}}NH$$

wherein X is selected from the group consisting of hydrogen, alkyl of up to 18 carbons, cycloalkyl of 3–18 carbons, allyl, propargyl, 2-cyclohexenyl and aralkyl of up to 18 carbons with the proviso that the aryl group is selected from phenyl and naphthyl; and X' is selected from the group consisting of hydrogen and alkyl of up to 18 carbons in which α-carbon is bonded to at most one other carbon, at most one of X and X' being hydrogen; and X and X' taken together is selected from the group consisting of 1,4-buten-2-ylene and an alkylene of 2–18 carbons in which at least one α-carbon is bonded to at most one other carbon, at a temperature of 0° C. to about 225° C.

14. The process of claim 13 wherein an excess of amine is reacted with unsubstituted β-amino-α-cyanoacrolein at a temperature of 25–125° C. under the autogenous pressure of the reactants.
15. The process of claim 13 wherein X of the amine is alkyl containing up to 18 carbon atoms.
16. The process of claim 13 wherein X of the amine is cycloalkyl of 3–18 carbon atoms.
17. The process of claim 13 wherein X and X' of the amine, taken together, is alkylene of 2–18 carbons in which at least one α-carbon is bonded to at most one other carbon.
18. A compound of claim 1 wherein R and R' are selected from the group consisting of hydrogen and alkyl and wherein the total number of carbon atoms in R plus R' is fewer than 19.

References Cited by the Examiner

UNITED STATES PATENTS

| 2,903,462 | 9/1959 | Nickels et al. | 260—310 |
| 2,905,694 | 9/1959 | Pinson | 260—310 |
| 2,994,703 | 8/1961 | Miller et al. | 260—326.5 |
| 3,043,845 | 7/1962 | Zaugg et al. | 260—294.7 |

WALTER A. MODANCE, *Primary Examiner.*

IRVING MARCUS, NICHOLAS RIZZO, *Examiners.*

JOSEPH W. MOLASKY, R. L. PRICE, AVROM D. SPEVACK, *Assistant Examiners.*